United States Patent
Chiang et al.

(10) Patent No.: US 8,941,720 B2
(45) Date of Patent: Jan. 27, 2015

(54) METHOD OF ENHANCING 3D IMAGE INFORMATION DENSITY

(75) Inventors: Ann-Shyn Chiang, Hsin Chu (TW);
Hsiu-Ming Chang, Hsin Chu (TW);
Yung-Chang Chen, Hsin Chu (TW);
Kuan-Yu Chen, Hsin Chu (TW)

(73) Assignee: National Tsing Hua University, Hsin Chu (TW)

( * ) Notice: Subject to any disclaimer, the term of this patent is extended or adjusted under 35 U.S.C. 154(b) by 553 days.

(21) Appl. No.: 13/019,991

(22) Filed: Feb. 2, 2011

(65) Prior Publication Data
US 2012/0194646 A1    Aug. 2, 2012

(51) Int. Cl.
*H04N 13/02*    (2006.01)
*G06T 3/40*    (2006.01)
*G02B 21/00*    (2006.01)
*G02B 21/16*    (2006.01)
*G02B 21/36*    (2006.01)

(52) U.S. Cl.
CPC ............ *G06T 3/4007* (2013.01); *G02B 21/008* (2013.01); *G02B 21/16* (2013.01); *G02B 21/367* (2013.01)
USPC .......................................................... 348/46

(58) Field of Classification Search
CPC ..... G02B 21/008; G02B 21/16; G02B 21/367
USPC .................................... 348/42–60
See application file for complete search history.

(56) References Cited

U.S. PATENT DOCUMENTS

| | | | | |
|---|---|---|---|---|
| 5,793,429 A | * | 8/1998 | Kim et al. | 375/240.17 |
| 7,672,976 B2 | * | 3/2010 | Tobin et al. | 707/999.107 |
| 8,126,206 B2 | * | 2/2012 | Tsurumi | 382/103 |
| 2003/0049712 A1 | * | 3/2003 | Haugwitz | 435/23 |
| 2003/0103047 A1 | * | 6/2003 | Chiabrera et al. | 345/419 |
| 2009/0135432 A1 | * | 5/2009 | Betzig | 356/521 |
| 2009/0185746 A1 | * | 7/2009 | Mian et al. | 382/209 |

OTHER PUBLICATIONS

Yi-Che Chen, Guan-Yu Chen, Wang Sheng Fen, and Yung-Chang Chen; Title: 3D Deconvolution of Transparent Microscopic Images, Journal, National Tsing Hua University, Hsinchu City, Taiwan.

* cited by examiner

*Primary Examiner* — Dave Czekaj
*Assistant Examiner* — Md Haque
(74) *Attorney, Agent, or Firm* — Chih Feng Yeh; Huntington IP Consulting Co., Ltd.

(57) ABSTRACT

A method of enhancing 3D image information density, comprising providing a confocal fluorescent microscope and a rotational stage. 3D image samples at different angles are collected. A deconvolution process of the 3D image samples by a processing unit is performed. A registration process of the deconvoluted 3D image samples by the processing unit is performed. An interpolation process of the registered 3D image samples by the processing unit is performed to output a 3D image in high resolution.

8 Claims, 18 Drawing Sheets

METHOD OF ENHANCING 3D IMAGE INFORMATION DENSITY

TECHNICAL FIELD

The invention relates in general to a method of processing 3D image, and more particularly to a method of enhancing 3D image information density.

BACKGROUND OF THE INVENTION RELATED ART

Confocal laser scanning microscopy (CLSM) is a valuable tool for obtaining high resolution images and 3D reconstructions by using a spatial pinhole to eliminate out-of-focus light or flare. This technology permits one to obtain images of various Z-axis planes (Z-stacks) of the sample. The detected light from an illuminated volume element within the specimen represents one pixel in the resulting image. As the laser scans over the plane of interest, where the beam is scanned across the sample in the horizontal plane by using one or more (servo-controlled) oscillating mirrors, the whole image is obtained pixel by pixel and line by line. Information can be collected from different focal planes by raising or lowering the microscope stage. Then the computer can calculate and generate a three-dimensional volume data of the specimen by assembling a stack of these two-dimensional images from successive focal planes.

However, the 3D image has a lower resolution in the Z-axis direction (e.g., about 1.2 μm/slice) than in the X-axis and Y-axis directions (about 0.15 μm/pixel) under the limitation of mechanical or physical properties. And the lower resolution in the Z-axis direction hampers the spatial reliability of the reconstructed high resolution neural network images, especially when comparison of two different samples is necessary. One of the inventors, Ann-Shyn Chiang, has disclosed an aqueous tissue clearing solution in U.S. Pat. No. 6,472,216 B1. In the '216 patent, the depth of observation may reach the level of hundreds micrometers. In the currently developing method, fluorescent molecules are attached to or combined with the biological tissue. Thus, making the tissue become transparent is a break-through for the observation in depth. And the way of solving the bottleneck of the Z-axis resolution is greatly needed.

SUMMARY

It is therefore an object of the invention to provide a method of enhancing 3D image information density through integrating multi-angle images to overcome the issue of poor resolution in Z-direction in confocal microscopy due to the limitation of mechanical or physical properties.

Another object of the invention is to provide a method of enhancing 3D image information density with an image fusion unit for fusing a plurality of sliced images of the sample acquired from different observation angles into a final image with higher resolution.

Another object of the invention is to increase the resolution of 3D image by means of fusing a plurality of sliced images of the sample acquired from different observation angles, especially increasing z-axis resolution of the 3D image of the sample.

It is a still further object of the invention to provide a method of enhancing 3D image information density for increasing the depth resolution of the image.

The invention achieves the above-identified object by providing a method of enhancing 3D image information density, comprising providing a confocal fluorescent microscope and a rotational stage. Next, 3D image samples at different angles are collected. A deconvolution process for the 3D image samples by a processing unit is performed, wherein the performing a deconvolution process comprises cropping the 3D image samples in a specified region, performing a blind deconvolution process on the specified region to estimate the point spread function, and performing a next deconvolution process to deconvolute the 3D image samples. Subsequently, a registration process of the 3D image samples is performed by the processing unit, wherein the performing a registration process comprises generating SIFT (Scale Invariant Feature Transform) matched features of every image of the 3D image samples, correcting the erroneously matched features, performing an initial transform operation which is computed from the matched features to original points of said 3D image samples to obtain the registered data, and performing a particle swarm optimization (PSO) minimizing errors on the cross lines to obtain the final registered data. Finally, an interpolation process of the 3D image samples is performed by the processing unit to output a 3D image in high resolution, wherein performing an interpolation process comprises performing a Kd-tree searching and performing an intensity rectification process.

In one embodiment, the generating SIFT (Scale Invariant Feature Transform) matched features comprises determining the Gaussian scale space; determining the difference of the Gaussian scale space; finding local extremum of said difference of the Gaussian scale space as SIFT frames; performing a sub-pixel refinement and finding the orientation; generating SIFT descriptors from the SIFT frames; and determining matched feature pairs between the model stack and the data stack.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be more fully understood from the detailed description given herein below and the accompanying drawings which are given by way of illustration only, and thus are not limitative of the present invention.

DETAILED DESCRIPTION

The invention hereinafter will be described in detail with preferred embodiments of the invention and accompanying illustrations. Nevertheless, it should be recognized that the preferred embodiments of the invention are not provided to limit the invention but to illustrate it. The present invention can be practiced not only in the preferred embodiments herein mentioned, but also in a wide range of other embodiments besides those explicitly described. Furthermore, the scope of the present invention is expressly not limited to any particular embodiments except what is specified in the appended Claims.

Figure 1:
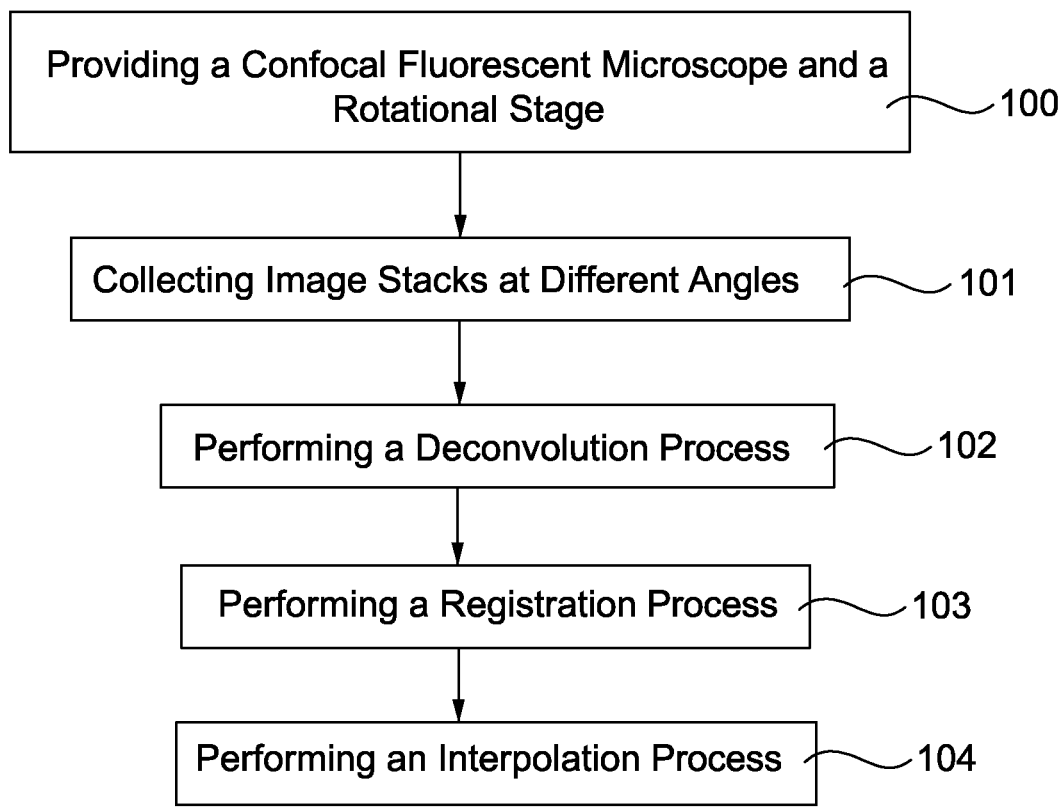
FIG. 1 is a flowchart showing a method of enhancing 3D image information density according to the present invention.

The present invention discloses a method of enhancing 3D image information density. FIG. 1 is a flowchart showing a method of enhancing 3D image information density according to an embodiment of the present invention.

With reference to FIG. 1, the method of enhancing 3D image information density of the present invention includes providing a confocal fluorescent microscope and a rotational stage, in the first step 100.

The present inventors have found that the sample may be rotated by a specific angle about a X-axis or a Y-axis so as to acquire segmented images of the sample from different observation angles. Then, the image fusion may be performed by way of image processing in order to solve the problem of the poor resolution in the Z-axis direction. In order to achieve this effect, a stage for supporting and holding the sample has to be configured to be revolvable. It is to be noted that the term "revolvable" means the revolvable angle ranges from 0 to 360 degrees, and this rotation may be out of the plane of the confocal fluorescent microscope platen. That is, the axis of rotation is not perpendicular to the plane of the confocal fluorescent microscope platen.

Moreover, a fluorescent microscope, a laser scanning microscope, a confocal microscope or a confocal fluorescent microscope may be applied to the present invention.

Next, referring to FIG. 1, image stacks at different angles are collected, in the second step 101.

The confocal fluorescent microscope with the revolvable stage according to the invention makes the sample be revolvable so that the image focusing module acquires the sliced images of the sample from different observation angles. The sample may be, for example, a brain of an insect. In addition, different sliced image stacks collected at different observation angles, such as 0 and 90 degrees, can be integrated. So, it is possible to fuse/reconstruct a three-dimensional image having the high resolution at three primary axes. The image fusion unit of the present invention is configured to record the known image intensity of the first sliced image stack and the second sliced image stack, which have been remapped and resampled, into the corresponding three-dimensional coordinate system, and then, calculate the image intensity of the unknown voxels by means of tri-linear interpolation or non-linear interpolation based on the neighboring known image intensity. As a result, lost voxels that are not recorded in the first and second image stacks can be rebuilt, and the depth resolution of the image can be increased. The accuracy to fuse three dimensional images in the confocal fluorescent microscope is facilitated by the present invention.

Subsequently, referring to FIG. 1, a deconvolution process is performed by a processing unit, in the third step 102.

In the present invention, a deconvolution process is designed to recover the distortion phenomenon caused by point spread function. Not until the distortion being recovered, can the data be used for any further investigation, since the distortion makes the data at hand incorrect. Only if the deconvolution process has successfully recovered the data, the following processes thereafter can be meaningful. In this algorithm, blind deconvolution (T. J. Holmes, "Blind deconvolution of quantum-limited incoherent imagery: maximum-likelihood approach," Journal of Optical Society of America A, Volume 9, Issue 7, pp. 1052-1061, 1992.) may be applied on a cropped region which has a simple shape and bright enough image data to estimate a reliable point spread function, and then deconvolution on the whole sample is applied with this point spread function to avoid the need of measuring PSF of whole sample and also increase the authenticity of the PSF for deconvolution.

Figure 2:
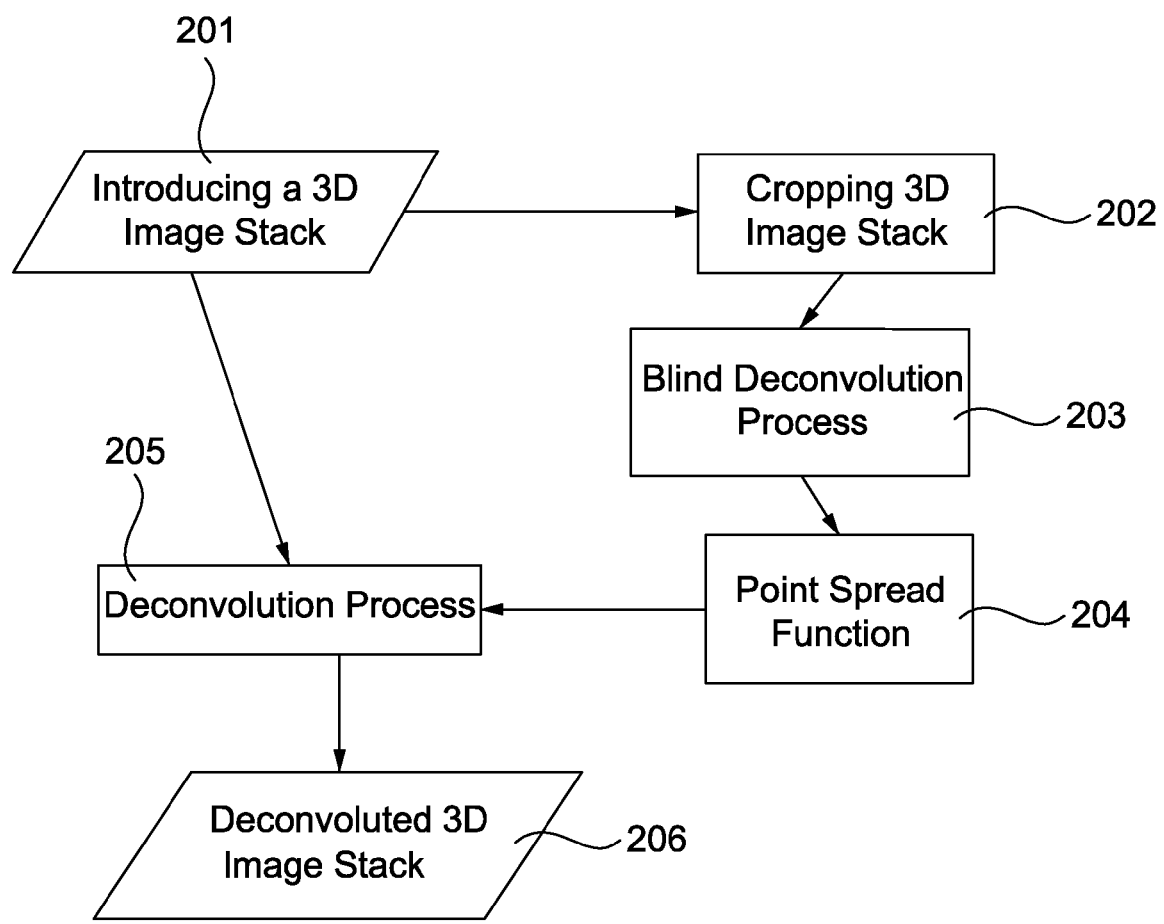
FIG. 2 shows a flowchart of the deconvolution process of FIG. 1.

As shown in FIG. 2, it shows a flowchart of the deconvolution process. In the step 201, the input data is introduced. For example, the input data comprises a plurality of various image stack sets to construct a 3D image stack of biological sample. The image stack is a series of images of the optical slice of the sample. In one embodiment, this algorithm is tested for confocal data, and a large pinhole size may be set to simulate wide field cases. As the end results show, the input works well for any light microscopes as long as it suffices the following conditions:

Each sample point is considered as a point light source.

The distortion is considered as a convolution process by each point light source with a fixed point spread function.

Next, in the step 202, the input of the 3D image stack is cropped in a specified region, usually a cell nucleus or any other point-like structure to simplify the optical interference.

Then, in the step 203, the blind deconvolution is applied on the specified region to estimate the point spread function. The blind deconvolution algorithm is capable of finding both the point spread function and the reconstructed undistorted 3D optical slices simultaneously from the originally captured 3D data sample by mathematical optimization iterations. Blind deconvolution made it feasible by supposing mathematical probability models of both the point spread function and the undistorted 3D optical slices and adding some constraints on the point spread function, and iteratively applying modifications on them, which, in short, is a constrained expectation maximization (EM) process. This constrained EM algorithm is especially sensitive to the initial guess of the point spread function and the initial guess of the reconstructed 3D data, and it is also sensitive to the complexity of the original data. To reduce optical complexity, the cropped region should suffice the following conditions:

Only one cell nucleus is cropped to minimize the complexity, and no lights from other cell nucleus spill into this region.

The cropped region must cover completely the light spread from the cell nucleus of interest, or the estimated point spread function may be incorrect.

In the present invention, the blind deconvolution may be implemented by the algorithm developed by T. J. Holmes in the reference below:

T. J. Holmes, S. Bhattacharyya, J. A. Cooper, D. Hanzel, V. Krishnamurthi, W. C. Lin, B. Roysam, D. H. Szarowski, and J. N. Turner, "*Light Microscopic Images Reconstructed by Maximum Likelihood Deconvolution*," *Handbook of Biological Confocal Microscopy* (3$^{rd}$ ed.), Chapter 24, pp. 389-402, 2006.

Figure 3:
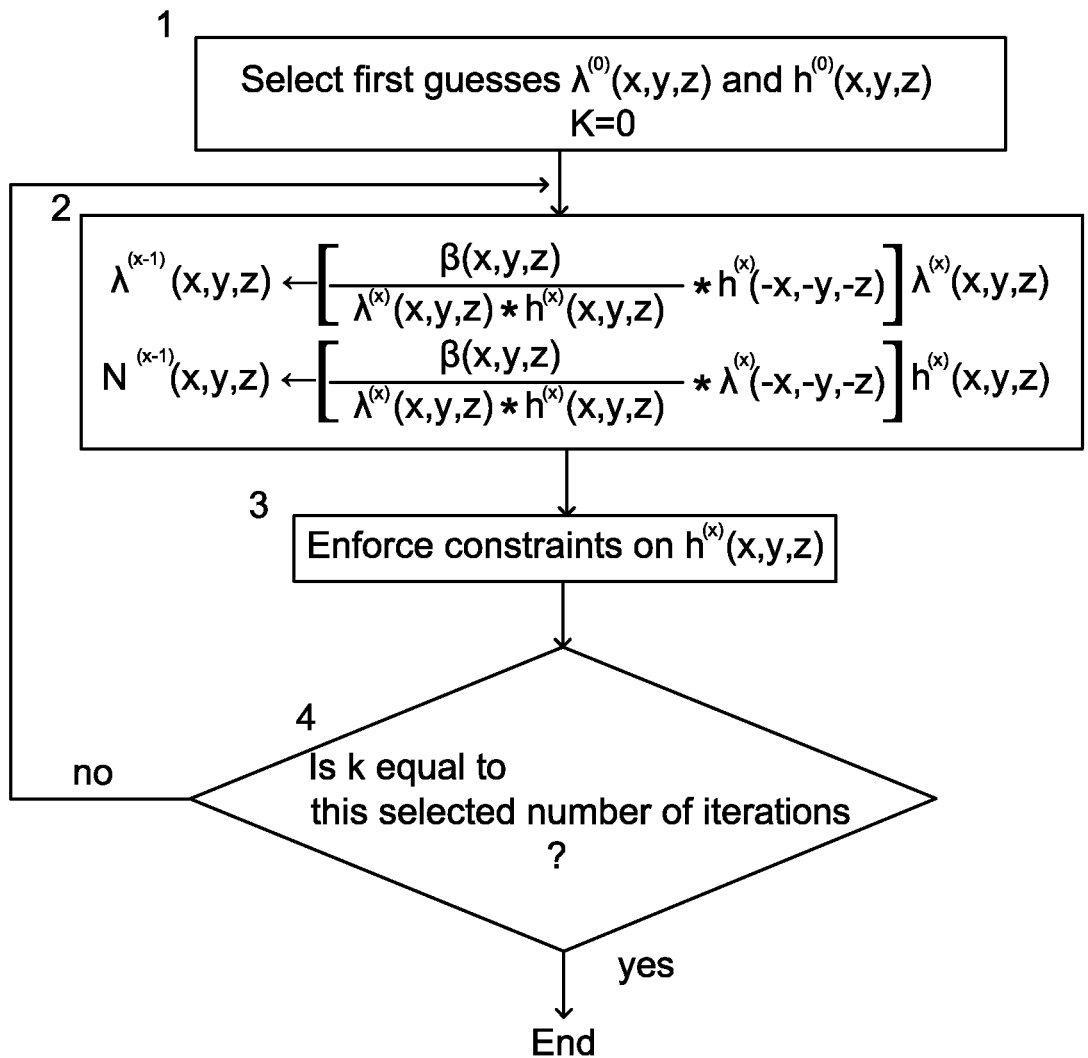
FIG. 3 shows a flowchart of the blind deconvolution.

As shown in FIG. 3, it shows a flowchart of the blind deconvolution developed by T. J. Holmes et al. which is an iterative algorithm. An initial guess of $\lambda(x, y, z)$ (fluorescent probe distribution (undistorted point light distribution)) and $h(x, y, z)$ (the impulse response (point spread function) of the optical system owing to diffraction) are given as input. The fluorescent probe distribution $\lambda(x, y, z)$ is the point light source distribution of the data sample, and the impulse response $h(x, y, z)$ indicates the point spread function herein. Then, two equations used to update $\lambda$ and $h$ for next iteration are calculated. The third step applies several constraints on the estimated point spread function according to some well-known PSF characteristics. After all, a stopping criterion should be made for further iterations. However, T. J. Holmes did not give a specific stopping criterion in his work, but only mentioned that the results seemed reasonable from 50 to 1000 iterations and turned out to break down after 1000 iterations.

In T. J. Holmes' work and some implementation details incorporated in the present invention's process, the complete iteration of "Expectation Maximization" algorithm can now be presented as the followings:

$$\hat{\lambda}^{(k+1)}(x) = \hat{\lambda}^{(k)}(x) \int_{R^2} \frac{\hat{h}^{(k)}(u-x)}{\hat{h}^{(k)}(u-z)\hat{\lambda}^{(k)}(z)dz} N_d(du) \quad (1)$$

$$\hat{h}^{(k+1)}(b) = \frac{\hat{h}^{(k)}(b)}{N} \int_{R^2} \frac{\hat{\lambda}^{(k)}(u-b)}{\hat{\lambda}^{(k)}(u-z)\hat{h}^{(k)}(z)dz} N_d(du) \quad (2)$$

T. J. Homes has summarized this iteration into nine steps, which are listed below with additional descriptions on implementation details:

Step 1: Choose a first guess of $\hat{h}^{(k)}(b)$ and $\hat{\lambda}^{(k)}(x)$ to feed the first iteration.

The initial sizes of both h and $\lambda$ are set to the same size of the captured data. The value of $\lambda$ is a constant value equal to the average of the captured data, and h is a 3D Gaussian function with Half-Width Full Maximum (HWFM) parameters with various tested size.

Step 2: Convolve $\hat{h}^{(k)}(b)$ with $\hat{\lambda}^{(k)}(x)$.

Fast Fourier Transform (FFT) is applied on both $\hat{h}^{(k)}(b)$ and $\hat{\lambda}^{(k)}(x)$, and the convolution result is obtained by inverse FFT after multiplication on the transformed $\hat{h}^{(k)}(b)$ and $\hat{\lambda}^{(k)}(x)$.

A double sized zero padding is applied on the operands before convolution to avoid artifacts caused by circular convolution.

Step 3: Divide the collected data $N_d(du)$ point by point by the result of step 2.

In this step, a potential error of dividing by zeros may occur, so a preprocessing step added before division is defined as follows:

$$\mu_p(\mu_p<10^{-30})=10^{-30} \quad (3)$$

$$\delta^{(k)}(x) = \lambda^{(k)}(x) * h^{(k)}(x) \quad (4)$$

$$\delta(\delta<10^{-30})=10^{-30} \quad (5)$$

Equation 5 is evaluated to avoid dividing by zeros, and Equation 3 is set to keep equality on those regions where the denominator and numerator are both zero.

Step 4: Convolve the result of step 3 with $\hat{h}^{(k)}(-b)$.

The convolution operation here is also done in the frequency domain, and the intermediate value of h is flipped according to its center.

Step 5: Multiply the result of step 4 point by point by $\hat{\lambda}^{(k)}(x)$. The result of this operation is used as the update $\hat{h}^{(k)}(x)$ in the next iteration.

This step obtains the fluorescent probe distribution (point light source distribution) for current iteration.

Step 6: Convolve the result of step 3 with $\hat{\lambda}^{(k)}(-x)$.

This is similar to step 4.

Step 7: Multiply the result of step 6 point by point by $\hat{h}^{(k)}(b)$.

This is similar to step 5.

Step 8: Perform a circular averaging of the result of step 7. In other words, for given radial distances from the origin, determine the average value of the result of step 7. The result of this operation is used as the update $\hat{h}^{(k)}(b)$ in the next iteration.

This step forces the result of point spread function to be circularly symmetric, which is a well-known characteristic of point spread function.

Step 9: $k \leftarrow k+1$. If the chosen number of iterations is not yet finished, go to step 2.

In the present invention, iteration steps between 50 and 1000 are randomly selected and compared. The final iteration step count may be decided by the user.

Subsequently, in the step 204, after blind deconvolution, a series of expected deconvoluted 3D data and a series of expected point spread functions are obtained with different iteration count. The obtained deconvoluted 3D data here is only confined to the user cropped region, which is believed to be correct if the cropped region is an isolated region without optical interferences from other regions. To apply this "correct" deconvolution process to the complete original 3D data, the point spread function is passed to the next deconvolution process to deconvolute the whole 3D sample, in the step 205. If the cropped region is chosen well, the blind deconvolution can perform a satisfying task yielding a correct point spread function.

Further, implementation details and parameter settings of the point spread function constraints can be found in T. J. Holms' paper.

On the other hand, a module in ImageJ developed by Bob Dougherty (reference to this site: http://www.optinav.com/Iterative-Deconvolve-3D.htm) is incorporated in the deconvolution process. Bob realized his deconvolution program according to the paper "Extensions of DAMAS and benefits and limitations of deconvolution in beamforming".

Then, in the step 206, after deconvolution, the original 3D data, which is a series of images captured by the microscope, is deconvoluted, and an undistorted (deconvoluted) 3D image stack with exactly the same size of the original 3D data shall be obtained. As a result, an image stack with each slice much sharper than the original captured one is expected.

From the above description, the estimated point spread function may bring to the perfectly reconstructed and undistorted 3D image stack by an iterative deconvolution algorithm.

Referring to FIG. 1, the method of enhancing 3D image information density of the present invention further includes performing a registration process by the processing unit, in the fourth step 103.

Figure 4:
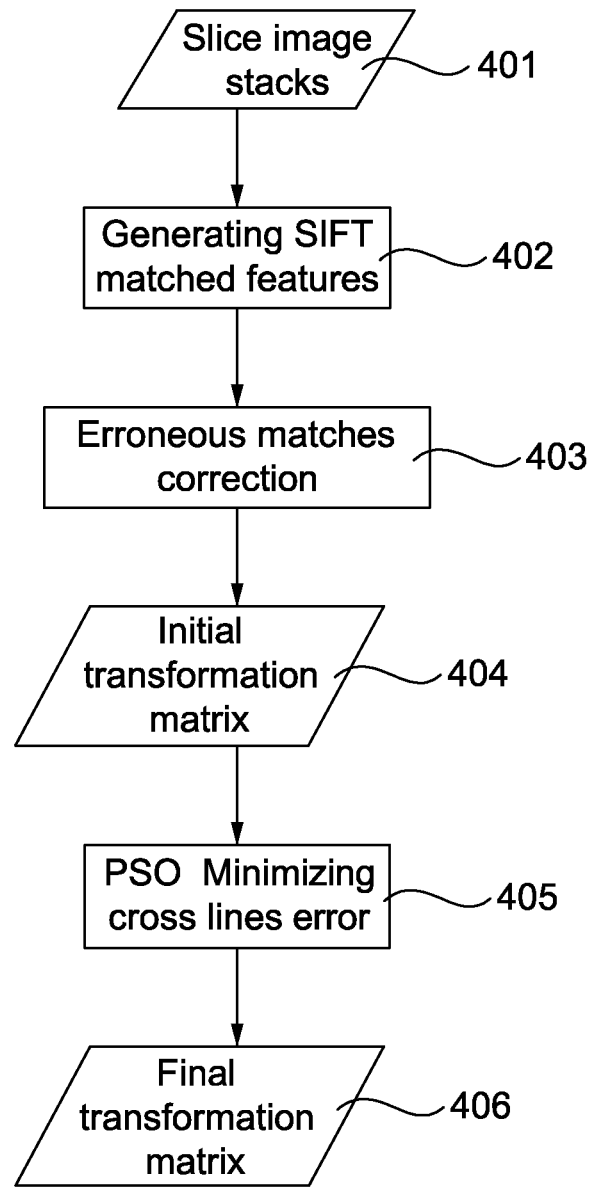
FIG. 4 is a flowchart of the registration process according to the present invention.

As shown in FIG. 4, it shows a flowchart of the registration process. After deconvolution process, the image stacks are provided, in the step 401. In the step 402, SIFT (Scale Invariant Feature Transform) matched features of every image stack is generated (D. G. Lowe, "Object Recognition from Local Scale-Invariant Features," in Computer Vision, 1999. The Proceedings of the seventh IEEE International Conference on, 1999, pp. 1150-1157 vol. 2; D. G. Lowe, "Distinctive Image Features from Scale-Invariant Keypoints, "Int. J. Comput. Vision, vol. 60, pp. 91-110, 2004). We assume that SIFT can still find the similar feature on the different source images within a small inclined angle. The process of generating SIFT features is described below.

Figure 5:
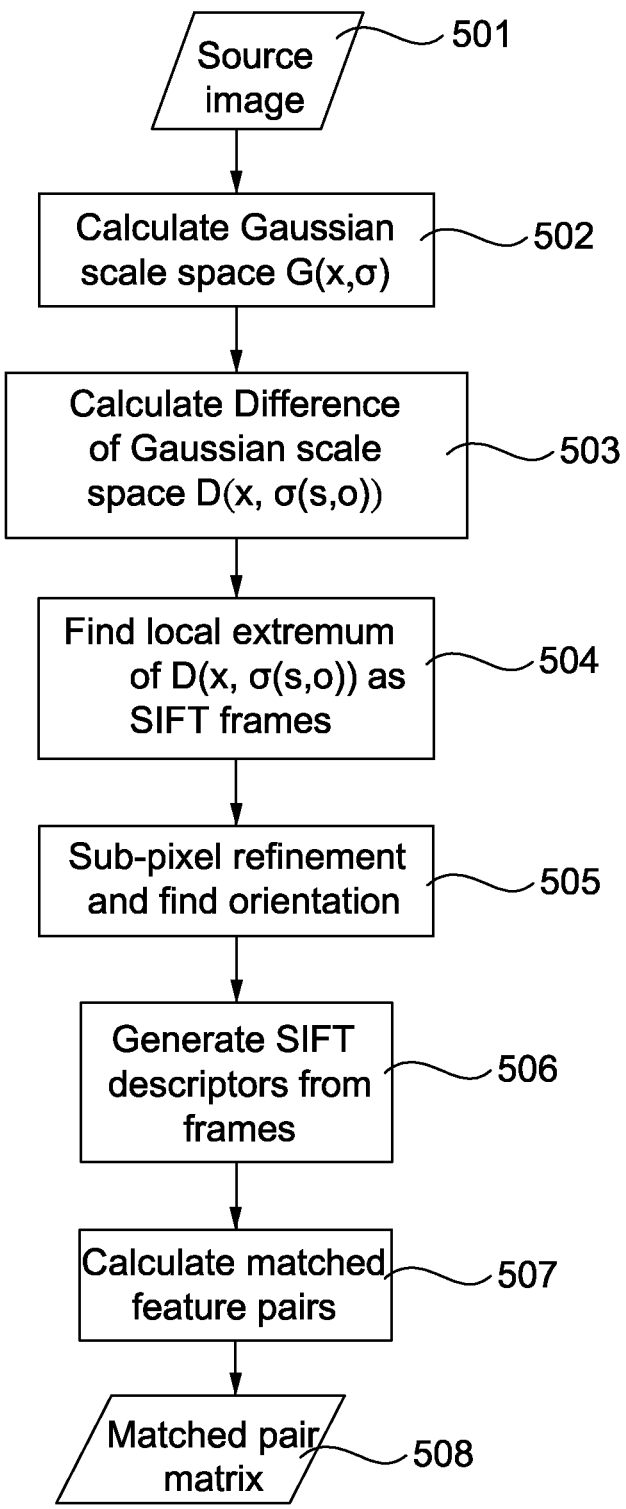
FIG. 5 shows a process flowchart of SIFT generating features and finding matches according to the present invention.
Figure 6:
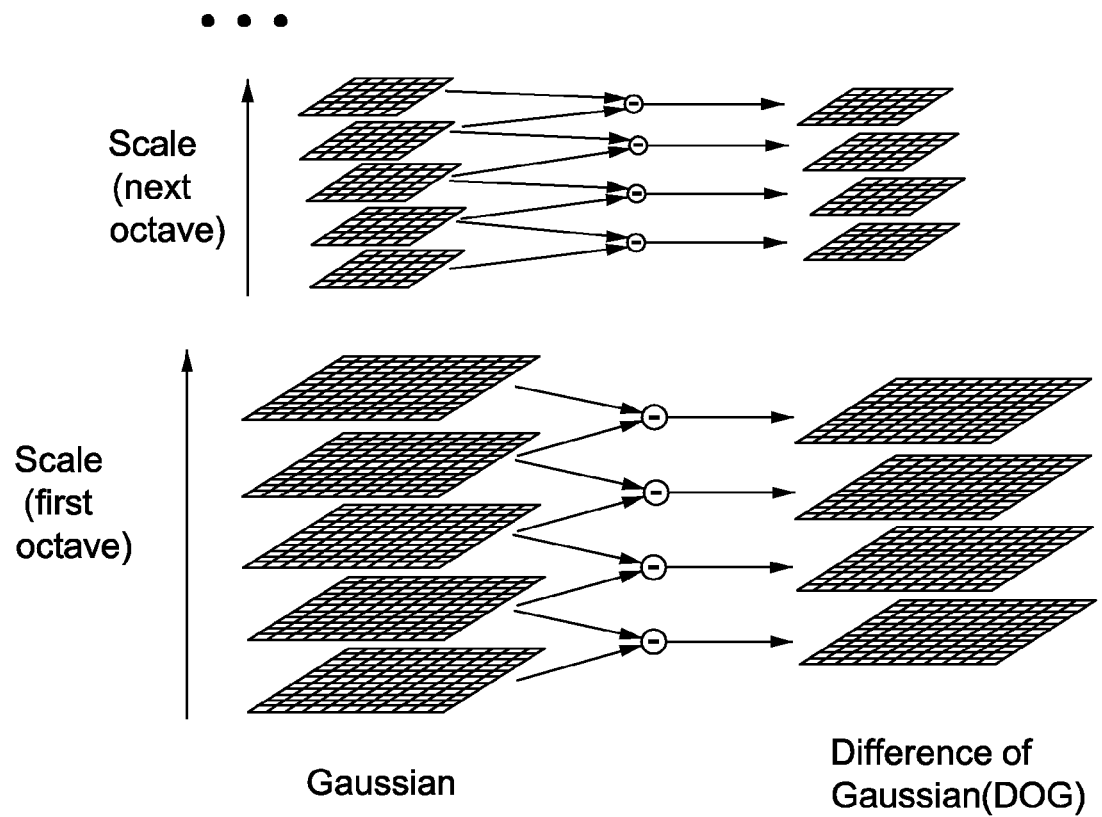
FIG. 6 shows a structure of Gaussian scale space according to the present invention.

As shown in FIG. 5, it shows a process flowchart of generating SIFT features and finding matches. Generally speaking, SIFT is scale invariant and orientation invariant which is crucial to our application because the object might shift away from its position. SIFT features are scale-invariant because it first re-scales the image into different scale space using isotropic Gaussian kernel of variance $\sigma^2 I$, called Gaussian scale space. For example, each scale has an octave index that indicates the image's spatial resolution; an octave index is two times smaller in spatial resolution than an adjacent larger one. Then, in the same octave index, there exists several sub-scale indexes representing different Gaussian blur of the source image in the same scale. The structure of Gaussian scale spaces are shown in the left part of FIG. 6.

In the step 501, the source image is introduced, for example the image stacks of the step 401. Next, in the step 502, Gaussian scale space is calculated. The Gaussian blur image G means that a Gaussian kernel is convoluted with the source image as Equation 6 below, $$G(x,\sigma)=(g_\sigma * I)(x) \quad (6)$$

and the Gaussian blur factor $\sigma$ can be expressed using octave index o and scale index s, which is shown as Equation 7.

$$\sigma(s,o)=\sigma_0 2^{o+s/S_{max}}, o_{max} \in Z, S_{max} \in N$$

$$o \in [0,\ldots,O_{max}-1], s \in [0,\ldots,S_{max}-1] \quad (7)$$

The o and s here are two parameters that affect the trade-off between computational time and performance. The original purpose of SIFT is to identify each object with various scale and orientation in images of common life. But in the present invention, the object's position under CLSM is basically fixed on the revolvable stage and that means the source images of different viewing angle are rather identical in scale and a little different in orientation and the object might slide away from the original position when viewing angle changes.

Thus, the o and s may be chosen as small as possible to reduce computational time. Here $o_{max}$ and $s_{max}$ are all set to 1 to simply compute the source image in the original scale and all other parameters are the same as Lowe's setting.

After generating the Gaussian scale spaces, two adjacent scale spaces are taken to calculate difference of Gaussian (DOG) scale space, in the step 503. The DOG scale spaces which are calculated by the following Equation 8 are shown in the right part of the FIG. 6.

$$D(x,\sigma(s,o))=G(x,\sigma(s+1,o))-G(x,\sigma(s,o)) \quad (8)$$

In the step 504, the local extremum (i.e. maxima and minima in every DOG scale space) of DOG will be found as SIFT frames by comparing each point with its 26 neighbors. The neighbors are distributed as shown in FIG. 7.

Figure 7:
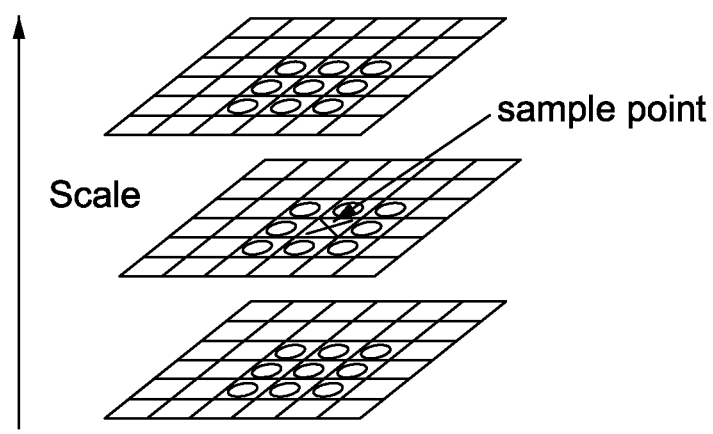
FIG. 7 shows neighbors of the DOG scale spaces according to the present invention.

As shown in FIG. 7, it shows 26 neighbors in the DOG scale spaces, wherein the three planes are adjacent to each other and of different sub-scale index s. The cross mark is the sample point, which will be compared with its 26 neighbors and checked if it is the minima or maxima. The process of comparing with neighbors is actually quite fast because usually after the first few calculations we will know that it's not an extrema.

Each local extrema is a SIFT frame which contains four elements: x, y, $\sigma$, $\theta$ and is represented as a circle. The center of a circle represents the position (x, y) of the SIFT frame, radius represents the deviation of the Gaussian kernel $\sigma$, and the direction represents the orientation $\theta$ of the spatial derivative. Next, in the step 505, it performs a sub-pixel refinement and finds the orientation.

Figure 8:
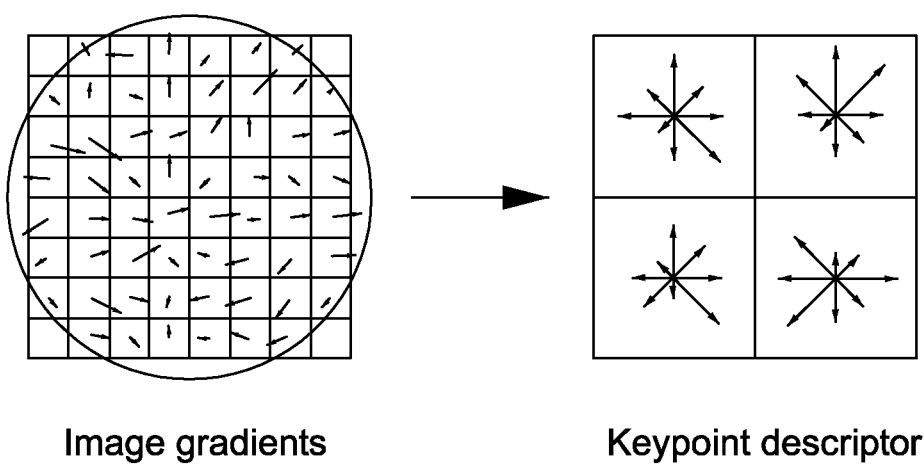
FIG. 8 shows SIFT frame to descriptor according to the present invention.

After the SIFT frame is generated, it will be transformed into a SIFT descriptor for matching in the step 506. The descriptor shown in FIG. 8 is generated from a 8×8 sample array to a 2×2 orientation histogram which has 8 bins to represent 8 orientations, while in actual usage, a descriptor is generated from a 16×16 sample array to a 4×4 histogram. This number is based on the experiment's requirement.

Each SIFT frame will be rotated back according to the $\theta$ parameter, thus achieving orientation-invariance of the features. The gradient of the SIFT frame is also illumination-invariant because in contrast change the gradient will be multiplied by the same constant and in brightness change the gradient won't be affected. But this doesn't include non-linear illumination changes. To avoid some relative large changes in gradient magnitude from non-linear illumination, each feature vector is scaled to a threshold not larger than 0.2 and then normalized to unit length.

After all key points' descriptors are generated, matched feature pairs between the model stack and the data stack are then calculated, in the step 507. Next, a matched pair matrix is then obtained, in the step 508. All images in the model stack will be compared with images in the data stack by using a "Best Bin First" search, which is a particular method for nearest-neighbor search. Experimental results show that SIFT can successfully identify the same feature in two different source images.

Figure 9:
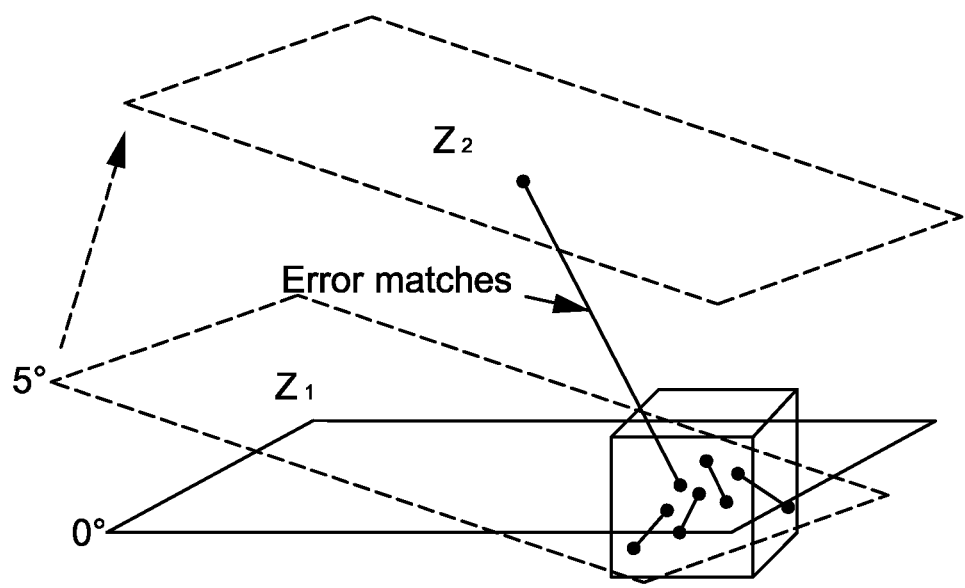
FIG. 9 shows matched pairs of two different original images according to the present invention.

After matching the SIFT features, in the step 403, some erroneous matches (matched features) may be corrected according to the scan conditions. The rough rotation degree is known from the revolvable stage. The image sources are all about the same object and the center of gravity of this object scanned from different view should not vary too much. Therefore, the matched pair should not be too far from each other. The visualized image of the erroneous matches is shown in FIG. 9 which shows matched pairs of two different source images.

Thus, to filter out those erroneous matches, we first make use of the rotation angle of the revolvable stage and the means of data stacks. Subsequently, an initial transformation matrix is obtained and is described as Equation 9.

$$R_{stage} = \begin{bmatrix} \cos(-\theta_{stage}) & 0 & \sin(-\theta_{stage}) \\ 0 & 1 & 0 \\ -\sin(-\theta_{stage}) & 0 & \cos(-\theta_{stage}) \end{bmatrix} \quad (9)$$

$$T_{stage} = C_{model} - C_{data}$$

Where $\theta_{stage}$ is the rotation angle of the revolvable stage. $R_{stage}$ simply rotates the object according to the Y-axis and $T_{stage}$ is the translation vector pointing from the mean of data points $C_{data}$ to the mean of model points $C_{model}$. This initial transform operation will be applied to both the matched feature pairs and the original points to maintain data consistency.

Then, a boundary around the model feature is set to check if the matched data feature is inside this boundary. In the present invention, the boundary is set as a cube and the width of this cube is set as Equation 10.

$$w_{cube} = 60/d_{down}$$

$$d_{down} = 2^n, n \in Z^+ \quad (10)$$

The number 60 is set empirically and the parameter $d_{down}$ is the down-sampling step number which is used to down sample the source images. In our experiments, applying this process reduced the number of matched pairs significantly which means there were many matched pairs with greater distance.

The next step, in the step 404, is to find a rigid transform that will minimize the Cartesian error between every matched feature in the space. The SIFT transformation including the registration from stage parameters and the Kabsch feature registration is described in Equation 11.

$$X_1 = R_{stage}(X_0 - C_0) + C_0 + T_{stage}$$

$$X_2 = R_{Kab}X_1 + T_{Kab}$$

$$R_{SIFT} = R_{Kab}R_{stage}$$

$$T_{SIFT} = R_{Kab}(-R_{stage}C_0 + C_0 + T_{stage}) + T_{Kab} \quad (11)$$

Figure 10:
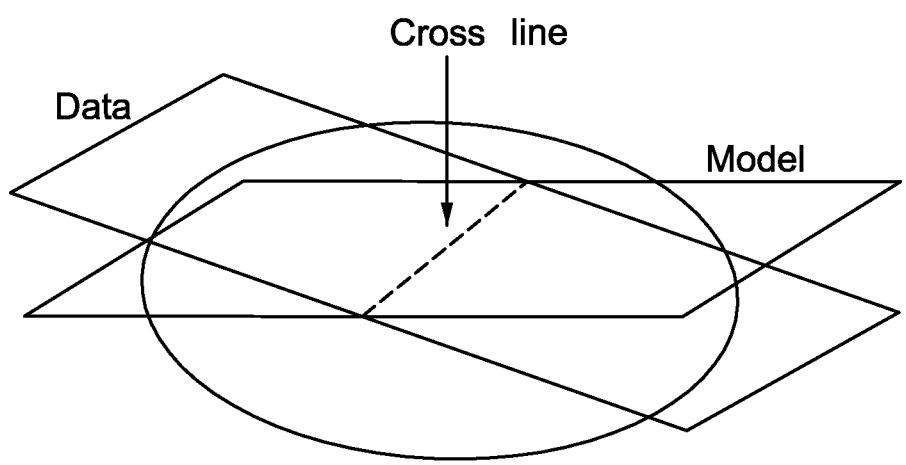
FIG. 10 shows a cross line of the same area between the model set and the data set according to the present invention.

In the last section, though the source stacks have already been registrated, it still needs to guarantee the cross lines' data consistency. From the illustration of FIG. 10, it could be seen that the images of the model set and the data set must intersect on a line and both information of the model image and data image must be the same on that line in some kind of measurement. The reason why the cross lines' data are not exactly the same is that the light emitted from the object will decay when CLSM is acquiring the image. Thus, different stacks sampled at different time are different in the over-all illumination. But still, these lines are important factors that can be used to determine the consistency of SIFT-registrated stacks.

Next, the local registration will be used to guarantee the pixel value on each of the cross lines, and the SIFT registration will be an excellent initial registration of the data stacks.

Figure 11:
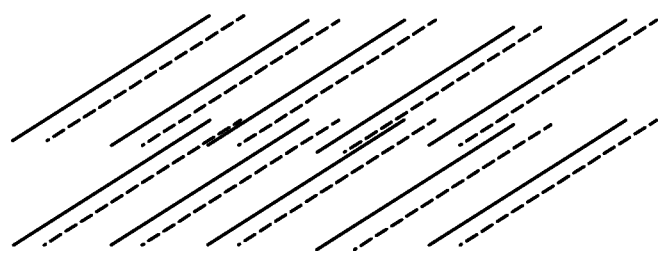
FIG. 11 shows a SIFT registration cross lines and the perfect registration cross lines according to the present invention.

Thus, it is reasonable to think that the actual cross lines exist in the nearby space of cross lines from SIFT registration. The assumption is illustrated in FIG. 11. The black lines are cross lines from SIFT registration and the gray dotted lines are cross lines from perfect registration. Moreover, it can try to find a new registration similar to the SIFT registration that minimizes the cross lines error.

Figure 12:
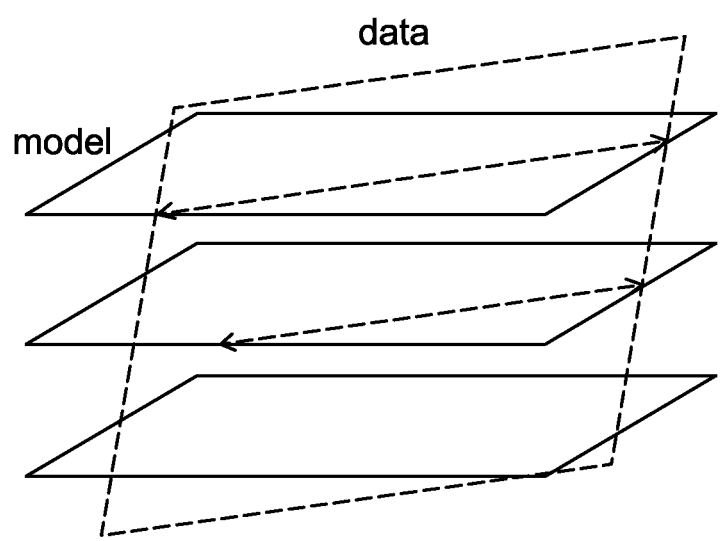
FIG. 12 shows cross lines always staying on model planes according to the present invention.

The line in this present invention is defined as the intersections of the bounded model image and the unbounded data image which can extend to ±∞ on its X-axis and Y-axis. The model image's boundary is the same as the dimension size by set when processing the images. Because the model image is the reference which doesn't move, no matter how the data image changes its position, the cross lines will always stay on the model image slices. The illustration of this phenomenon is shown in FIG. 12. The dotted plane is the data plane and the thin dotted lines are the cross lines. It can be seen that the end points of the cross line are right on the boundary of the model image. These end points can help finding the intersection of the unbounded data plane and bounded model plane. The calculation for finding the end points of the cross line is described as follows.

where a, b, c, and d are the parameters of the model and data plane. The im_size is the dimension size by set when processing the source image. By setting one of the axis value to 0 or im_size-1 (i.e. fixing the axis where solution exists.), it can definitely solve two end points of each data and model plane pair. After checking the end points are all staying inside another axis boundary, the vector or slope of the cross line is then acquired. The method of getting vectors is depicted in the following section.

First, randomly get three different points from the same image and select one of them as reference. And the other two are subtracted from the reference to get two vectors.

$$v_1 = p_2 - p_1$$

$$v_2 = p_3 - p_1 \quad (13)$$

From these two vectors' cross product, get normal vector of the image plane and check if the normal vector is equal to zero vector or not, if it is, resample three points. After the normal vector is valid, normalize it.

$$v_n = v_1 \times v_2$$

$$|v_n| = 1 \quad (14)$$

Next, examine if the normal vector is pointing to the positive Z-axis direction, if it's not, change the direction to the opposite.

$$\begin{cases} v_n, & v_{nz} \in R^+ \\ -v_n, & v_{nz} \in R^- \end{cases} \quad (15)$$

After obtaining the normal vector of the model stack and data stack respectively, get the first non-zero point of every image plane as the reference point to compute the parameters of the plane equation.

With every plane's parameters, the cross lines' function between model plane and data plane can be calculated. The cross line's vector can be calculated by cross product of the model and data plane's normal vectors.

$$v_{line} = v_{n,model} \times v_{n,data}$$

$$|v_{line}| = 1 \quad (16)$$

For convenience, all line vectors' direction is set to the positive Y-axis direction.

$$\begin{cases} v_{line}, & v_{line,y} \in R^+ \\ -v_{line}, & v_{line,y} \in R^- \end{cases} \quad (17)$$

With the line vector, the existing cross lines can be acquired. Subsequently, in the step 405, a particle swarm optimization (PSO) minimizing cross lines error is performed. The algorithm of the particle swarm optimization (PSO) is quite simple and easy to implement. The algorithm will be described in the following section. At the beginning, it $$\begin{cases} y = ((d_m - d_d) - (c_m - c_d)z - (a_m - a_d)x)/(b_m - b_d), & x = 0, y \in [0 \ldots \text{im\_size}] \\ y = ((d_m - d_d) - (c_m - c_d)z - (a_m - a_d)x)/(b_m - b_d), & x = \text{im\_size} - 1, y \in [0 \ldots \text{im\_size}] \\ x = ((d_m - d_d) - (c_m - c_d)z - (b_m - b_d)y)/(a_m - a_d), & x \in [0 \ldots \text{im\_size}], y = 0 \\ x = ((d_m - d_d) - (c_m - c_d)z - (b_m - b_d)y)/(a_m - a_d), & x \in [0 \ldots \text{im\_size}], y = \text{im\_size} - 1 \end{cases} \quad (12)$$

needs to initialize some parameters for the following iteration to go well. First, let the search space be on the X-Y plane and exist N particles, which are also called agents. The defined initial search area is bounded by $b_{low}$ and $b_{up}$ which are both 2-D vectors representing the X-axis' and Y-axis' lower bound and upper bound. Then, each agent's initial position $x_i$ is generated as a random vector of the following function $U(b_{low}, b_{up})$.

Figure 13:
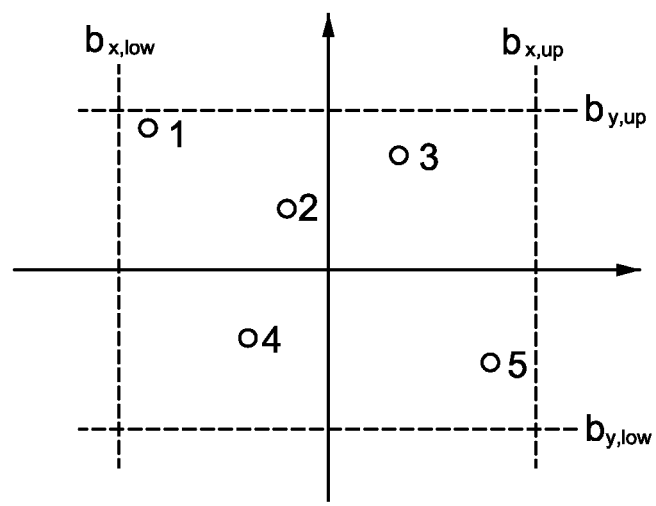
FIG. 13 shows the bounded initial positions of agents according to the present invention.

Now, the agents' initial positions are possibly anywhere inside the area bounded by the lower and upper bound. The illustration can be seen in FIG. 13 which shows the bounded initial positions of agents.

After deciding the initial positions of agents, it needs to decide the initial search direction and the search step for each agent, which is also called the velocity. Thus, for every agent there exists an initial velocity $v_i$ that is decided by the following random vector which is set to prevent the agent moving too far from the initial bounded area.

$$v_i \in U(-(b_{up}-b_{low}),(b_{up}-b_{low}))$$
$$i=1\ldots N \quad (18)$$

Now, the spirit of PSO is set by the following two parameters which are the agent's best search $p_i$ and the group's best search g. The $p_i$ preserves the same agent's best search solution and the g preserves the best search solution among all the $p_i$ solution. And the best solution is determined by an objective function $f$. Thus, in the initialization procedure, all the $p_i$ are set as the same as the initial position $x_i$ and the g is set as the best among all $p_i$ which is determined by function $f$.

For iteration, the velocity update rule is described as follows.

$$v_i \leftarrow \omega v_{i-1} + \phi_p r_p^T (p_i - x_i) + \phi_g r_g^T (g - x_i) \quad (19)$$

Figure 14:
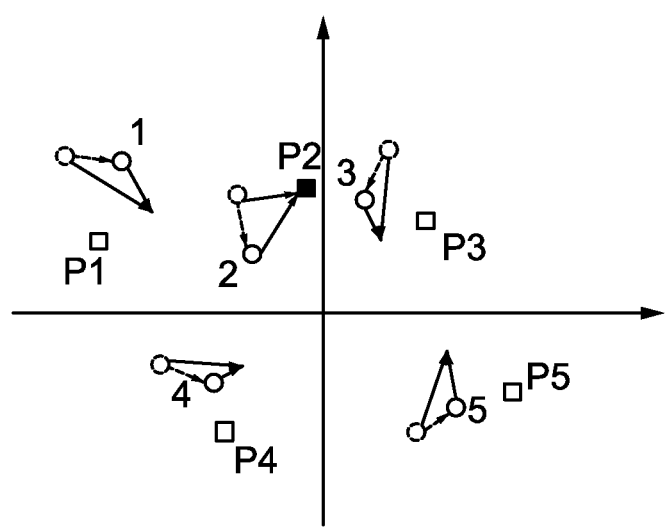
FIG. 14 shows an iteration searching process according to the present invention.

The $\omega$, $\phi_p$, and $\phi_g$ are weightings referring to the current velocity, the vector pointed from the current position to the agent's best position, and the vector pointed from the current position to the group's best position. These weightings can be adjusted according to the user's experiment to prevent from diverging too early. The random vector $r_p$ and $r_g$ are the adjusting amount of the direction update vectors to $p_i$ and g, and are defined as $r_p$, $r_g \in U(0,1)$. From the velocity update rule, it can be realized that each agent will search the new area that is decided according to its previous direction and the adjustment towards the direction from its best search and the group's best search. The iterative searching process, which is updating agent search position, can be illustrated as FIG. 14.

The solid line squares are all $p_i$s' positions and the solid square is the g's position. The dotted arrow is the previous velocity of each agent. The thin solid arrow is the adjustment of each agent, which corresponds to the last two terms of the updating rule. The thick arrow is the updated velocity of each agent.

Finally, each agent's position $x_i$ can be updated by adding the new velocity to the previous position as follows: $x_{i+1} = x_i + v_i$.

After the above procedure is done, the PSO algorithm completes one iteration. By doing several iterations, the algorithm can be stopped according to either fixed iteration number or unchanged error.

In the present invention, it may try to apply the PSO to find the perfect registration with the verification of the cross lines' content, which means to generate a refined transformation matrix for the SIFT-registered data stack. The agent position defined in the last section now can be generalized to a position vector M which is a 6-D space vector representing the three axes' rotation degree and translation.

$$M = [\theta_x, \theta_y, \theta_z, T_x, T_y, T_z]^T \quad (20)$$

The agent number N is set as 30 and each agent contains a vector M to preserve the current transformation information. The degree boundary of each axis is defined to be within ±4° and the translation boundary of each axis is defined to be within ±5 pixels, which is shown below.

$$b_{\theta,low} = \begin{bmatrix} -4° \\ -4° \\ -4° \end{bmatrix}, b_{\theta,up} = \begin{bmatrix} +4° \\ +4° \\ +4° \end{bmatrix}, b_{T,low} = \begin{bmatrix} -5 \\ -5 \\ -5 \end{bmatrix}, b_{T,up} = \begin{bmatrix} +5 \\ +5 \\ +5 \end{bmatrix} \quad (21)$$

The initial velocity $v_i$ of each agent is defined by the uniform random function with the velocity boundaries defined in Equation 18. The defined position here is actually an adjustment to the whole coordinate system because it must combine the SIFT registration result first to continue the refinement process. Finally, with a transformation combination process which is described below, in the step 406, a final transformation matrix is obtained.

$$\left.\begin{array}{l} C_1 = R_{SIFT}C_0 + T_{SIFT} \\ C_2 = R_{PSO}(C_1 - M_1) + M_1 + T_{PSO} \end{array}\right\} C_2 = R_{total}C_0 + T_{total} \quad (22)$$
$$R_{total} = R_{PSO}R_{SIFT}, T_{total} = R_{PSO}T_{SIFT} - R_{PSO}M_1 + M_1 + T_{PSO}$$

Now, it needs to define the objective function $f$ to decide which parameter set is the best among all agents. And $f$ is defined as follow.

$$E_{pixel} = f(L_{model}, L_{data}) = \frac{\sum_{i=1}^{N_{total\ line}} \left( \frac{\sum_{non-zero\ pixel} |d_{model} - d_{data}|}{N_{non-zero\ pixel}} \right)}{N_{total\ line}} \quad (23)$$

where $E_{pixel}$ represents the average error between the model lines and data lines. L is the cross line array and d is the single pixel value on the cross line. $N_{non-zero\ pixel}$ is the number of pixels that are on the either model or data line with pixel value larger than zero. $N_{total\ line}$ is the number of cross line pairs that the reference model line has at least one non-zero pixel value on it. After applying the transformation, the error of each agent can be measured by Equation 23 and the group best position g can also be determined.

After computing all parameters, the iteration will start to update the velocity by similar method described in Equation 19. The three weightings are all set to be no larger than 1 to prevent the algorithm diverging from the SIFT result too soon. After the velocity is updated, it will execute the summation to update the transformation parameter of each agent to proceed to the next iteration. In the present invention, the stopping criteria is set as reaching the maximum iteration number because it is not sure what value can be the $E_{pixel}$'s minimum.

Referring to FIG. 1, the method of enhancing 3D image information density of the present invention further includes performing an interpolation process by the processing unit, in the fifth step 104.

As above-mentioned, the rotated image slices are handled by the deconvolution process and the registration process, followed by utilizing an interpolation process to make new image slices for enhancing Z-axis direction resolution. In one embodiment, this Z-axis interpolation for confocal microscopy images is performed. In the present invention, the input data comprises multi image stacks with different rotation angle to construct a 3D image stack of biological sample, and therefore more reference information for interpolation and which is a three-dimensional range. Firstly, spatial points are clarified by an appropriate classification for facilitating intensity-based interpolation efficiently. In one embodiment, the application uses the intensity-based interpolation due to pure intensity information and no additional edge or shape information. The data presented in the final process comprises the real points from real information and the predicted points from the interpolation method, which are unknown from real information.

Figure 15:
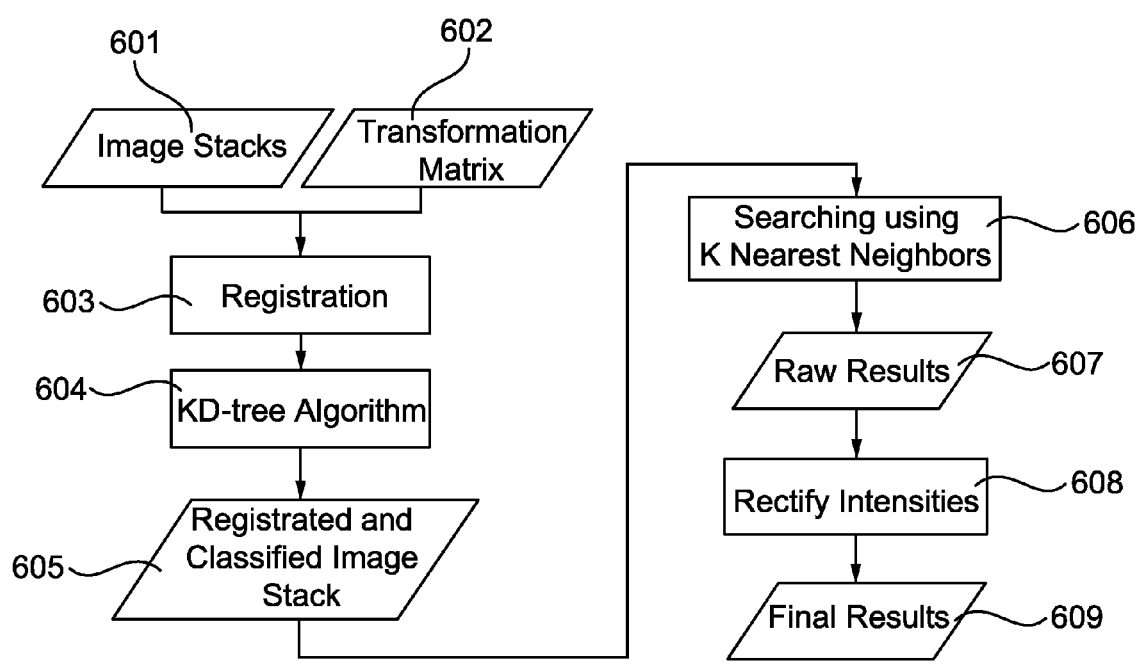
FIG. 15 shows a flowchart of the interpolation process according to the present invention.
Figure 16:
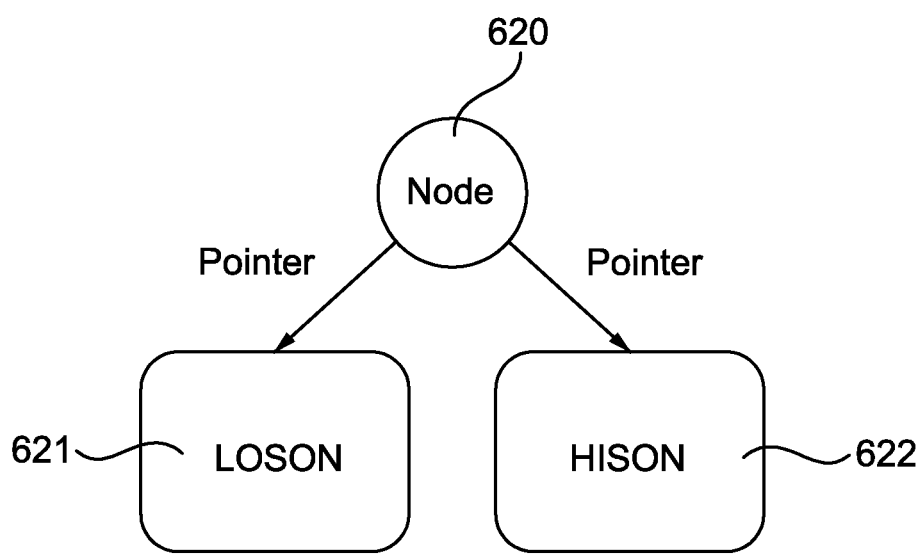
FIG. 16 shows a framework of the Kd-tree according to the present invention.

As shown in FIG. 15, it shows a flowchart of the interpolation process. As above-mentioned, the rotated image slices are handled by the deconvolution process and the registration process; that results in the deconvoluted image stacks in the step 601 and a computed transformation matrix in the step 602 to reach the registration in the step 603, and followed by the interpolation process. In the interpolation process, firstly, it is utilizing a Kd-tree method for facilitating KNN (K-nearest neighbor algorithm) searching efficiently. Kd-tree may be a multidimensional binary search tree which is a data structure for information storage (Please refer to: Jon Louis Bentley, "Multidimensional Binary Search Tree Used for Associated Searching," Stanford University, 1975.). It can latter be retrieved by associative searches. Introduction of the Kd-tree algorithm is depicted in the following section. Framework of the Kd-tree is shown in FIG. 16.

Next, in the step 604, a Kd-tree algorithm is implemented. Kd-tree algorithm is for finding the nearest point level by level. The detailed description of the Kd-tree algorithm is depicted in the followings. Node 620 is any point of the information. K keys are node feature of K dimensional space; in three dimensional space, the selected node has three keys which are xyz coordinates. Node 620 points to subspaces (sub-groups) HISON 622 and LOSON 621 by a pointer, respectively. Sub-groups HISON 622 and LOSON 621 in the Kd-tree are separated by discriminators (DISCs) with the key of node. The construction of the Kd-tree is described as followed. For any node Q in LOSON(P), it's true that Kj(Q)<Kj(P); for any node Q in HISON(P), it's true that Kj(Q)>Kj(P), wherein Kj(P) is j-th key of node P. The selected j-th key of node P, Kj(P), is as discriminator, and all nodes smaller than Kj(P) are assigned to the group of LOSON(P), and all nodes larger than Kj(P) are assigned to another group of HISON(P), which describes as follow.

$$\begin{cases} K_j(Q) < K_j(P) \to Q \in LOSON(P) \\ K_j(Q) > K_j(P) \to Q \in HISON(P) \end{cases} \quad (24)$$

Next, equality of keys is solved by the superkey function which is a discriminant function that all keys multiply each other.

$$S_j(P) = K_j(P)K_{j+1}(P)\ldots K_{k-1}(P)K_0(P)\ldots K_{j-1}(P) \quad (25)$$

The discriminant is the same as the former; for any node Q in LOSON(P), it's true that Sj(Q)<Sj(P); for any node Q in HISON(P), it's true that Sj(Q)>Sj(P). All nodes smaller than Sj(P) are assigned to the group of LOSON(P), and all nodes larger than Sj(P) are assigned to another group of HISON(P), which describes as follow.

$$\begin{cases} S_j(Q) < S_j(P) \to Q \in LOSON(P) \\ S_j(Q) > S_j(P) \to Q \in HISON(P) \end{cases} \quad (26)$$

After completed construction of one level KD-tree, it proceeds to next node and discriminator. In the next level KD-tree, the selected discriminator key is determined based on NEXTDISC equation. K keys are used in turn to construct the whole KD-tree. For two dimensional space, the first level uses x coordinate and the second level uses y coordinate, and the third level uses back to x coordinate as discriminator.

$$\text{NEXTDISC}(i) = (i+1) \bmod k \quad (27)$$

Next, in the step 605, registrated and classified image stack is obtained after the Kd-tree algorithm. In one embodiment, node 620 is selected by finding "median point" from the information, namely the center of the all information. Therefore, there exists some difference between node and point. The selected node may be a virtual point which is absent in the original information. That is, median method could generate a virtual point. That is, the discriminated node is just for discriminating, and all information is stored in the subsets.

Subsequently, in the step 606, KNN (K-nearest neighbor algorithm) searching is performed. Point searching in KNN is finding neighbor K points of one point to estimate and classify such point by its neighbor K points. Nearest Neighbor Queries is finding P's nearest neighbor, Q, in B such that $$(\forall R \subset B)\{(R \neq Q) \Rightarrow [D(R, P) \geq D(Q, P)]\} \quad (28)$$

$$\begin{cases} D : \text{distance function} \\ B : \text{collection of points in } k\text{-dimensional space} \\ P : \text{single point} \\ Q : \text{the nearest neighbor} \end{cases}$$

In one embodiment, a Kd-tree method is implemented prior to KNN (K-nearest neighbor algorithm) searching, which finds P's nearest neighbor, Q. And this searching method is more efficient than that without using Kd-tree method. Then, raw results are obtained, in the step 607.

In the step 608, an intensity rectification is performed. Different image stacks may have different intensity distribution, so to rectify the intensity is necessary. In the present invention, it tries to fix artifacts generated from the intensity-based interpolation. The assumption is that the intensity (gray-level value) change between image slices (such as two adjacent image slices) is continuous.

Figure 17:
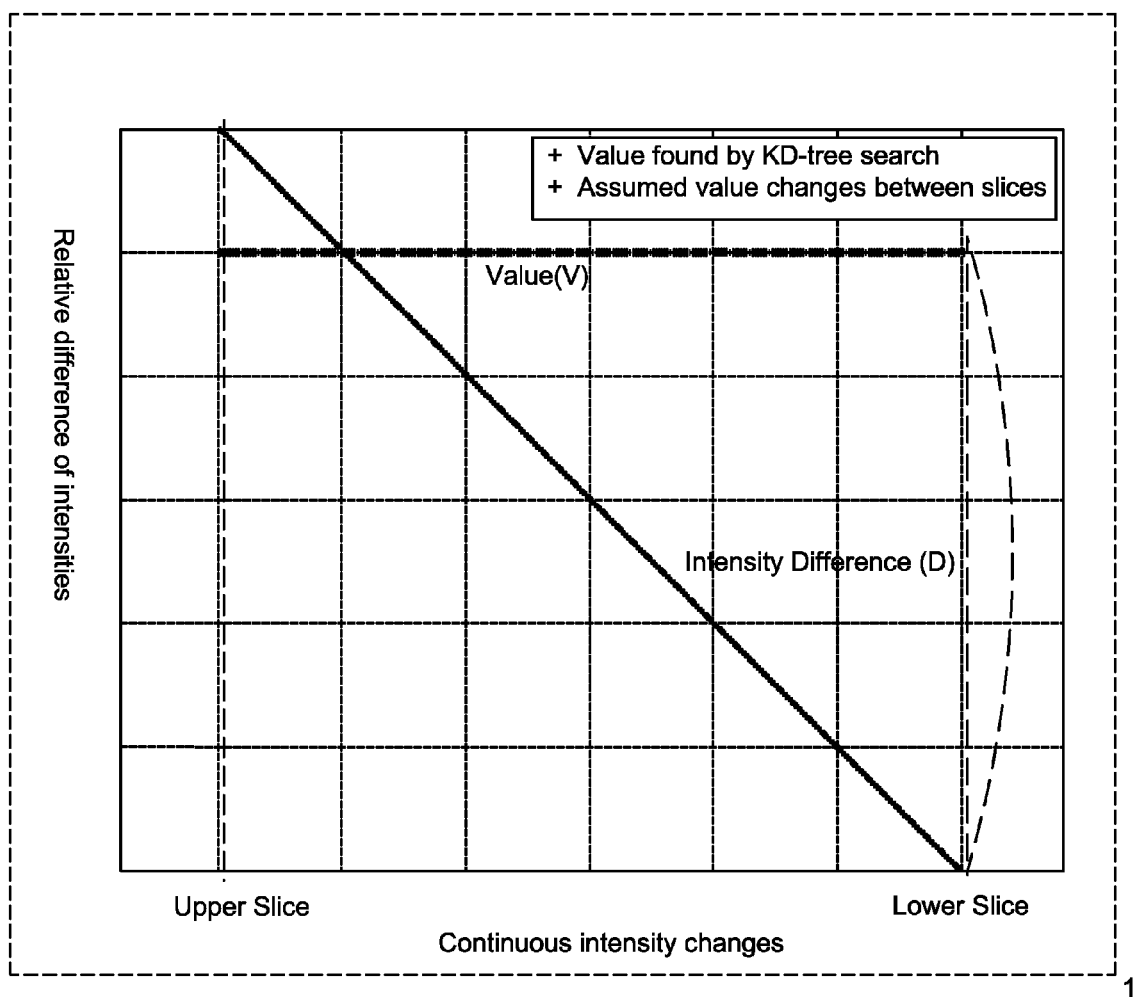
FIG. 17 shows a continuous intensity changes between upper slice and lower slice according to the present invention.

As shown in FIG. 17, it shows continuous intensity changes between upper slice and lower slice. The found value, which comes from nearest neighbor by interpolation method (by Kd-tree search), has an intensity difference with the assumed value, which comes from continuous intensity changes between upper slice and lower slice. In one embodiment, to maintain continuous intensity changes, a sigmoid weighting function may be applied to adjust the weighting between the found value and the assumed value.

$$S_M(t) = \frac{1}{1+e^t} \quad (29)$$

The Equation 29 is the sigmoid weighting function applied to the present invention. Therefore, gray-level value interpolation method (by Kd-tree search) should not only find the interpolated value from nearest neighbor but also need a rectification function to satisfy the continuous changes. In one embodiment, the rectification function describes as below.

$$Value_M = Value + sign \times dist(Value - Kd) \times S_M\left(\frac{dist(Value - Kd)}{dist_{Normalize}(Value - Kd)}\right) \quad (30)$$

$$\begin{cases} Value: \text{assumed intensity changes intercepted at interpolation position} \\ dist: \text{the distance function} \\ Kd: \text{close points found by } k\text{-}d \text{ tree} \\ S_M: \text{the sigmoid weighting function} \end{cases}$$

Figure 18:
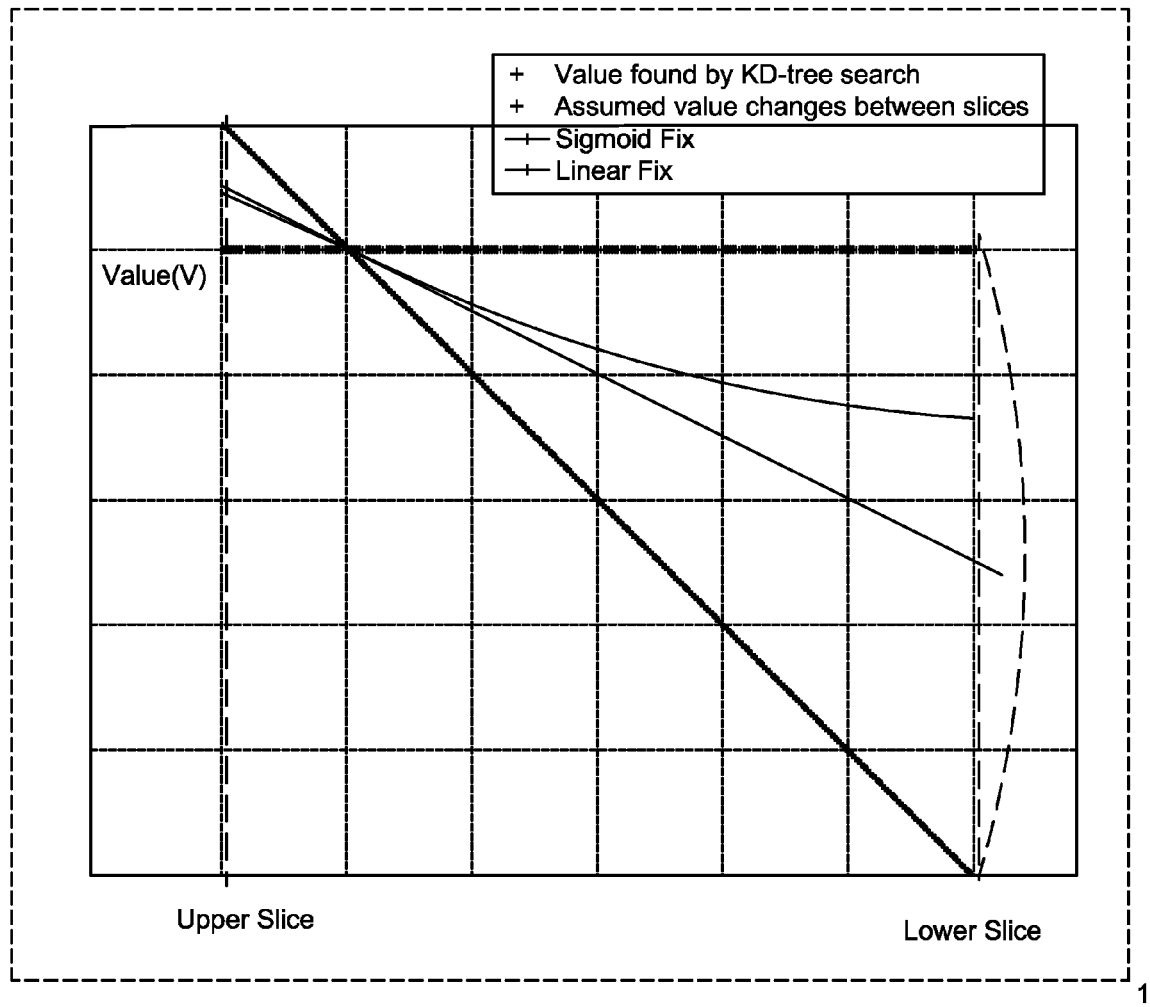
FIG. 18 shows a final value of gray-level according to the present invention.

Finally, in the step 609, based-on Equation 30, when the found value by Kd-tree search is too far away from the assumed value, the final gray-level value is subjected to a substantial preset value; when the found value by Kd-tree search is close to the preset value, the final gray-level value is subjected to a substantial Kd-tree search. That is, when (Value-Kd) decreases and then $S_M$ increases, Kd is dominant; when (Value-Kd) increases and then $S_M$ decreases, Value is dominant. The final value of gray-level is shown in FIG. 18, wherein the upper curve is the result by using sigmoid weighting function. The middle line is the result by using linear weighting function. It is noted that the sigmoid weighting function may be utilized to rectify the defect of gray values more smoothly.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method of enhancing final 3D image information density by fusing images stacks acquired at different observation angles, comprising:
    performing a deconvolution process for each of a plurality of 3D image samples acquired from different observation angles, defined by rotation angles of a revolvable stage, by a processing unit designed to recover the distortion caused by a point spread function, wherein said performing a deconvolution process comprises performing a blind deconvolution to find said point spread function and the reconstructed undistorted 3D optical slices from said 3D image samples;
    performing a registration process of said deconvoluted plurality of 3D image samples acquired from different observation angles by said processing unit, wherein said performing a registration process comprises generating SIFT (Scale Invariant Feature Transform) matched features of every image of said plurality of 3D image samples; and
    performing an interpolation process of said registered 3D image samples acquired from different observation angles by said processing unit to output a final 3D image with increased depth resolution in said final 3D image;
    wherein said performing an interpolation process comprises performing a searching process, and performing an intensity rectification process to fix artifacts generated from an intensity-based interpolation;
    wherein said performing an intensity rectification process comprises providing a weighting function to maintain continuous intensity changes between upper slice and lower slice and a rectification function to satisfy said continuous intensity changes.

2. The method according to claim 1, wherein said blind deconvolution is performed in a cropped region of said 3D image samples to estimate said point spread function, that is used to deconvolute said 3D image samples according to said point spread function.

3. The method according to claim 1, wherein said performing a registration process further comprises:
    correcting erroneous said matched features;
    performing an initial transform operation of said matched features and original points of said 3D image samples to obtained a registrated data; and
    performing a particle swarm optimization (PSO) minimizing cross lines error.

4. The method according to claim 3, wherein said generating SIFT (Scale Invariant Feature Transform) matched features comprises:
    determining Gaussian scale space;
    determining difference of said Gaussian scale space;
    finding local extremum of said difference of said Gaussian scale space as SIFT frames;
    performing a sub-pixel refinement and finding the orientation;
    generating SIFT descriptors from said SIFT frames; and
    determining matched feature pairs between the model stack and the data stack.

5. The method according to claim 1, wherein said searching process comprises a Kd-tree algorithm.

6. The method according to claim 5, further comprising a step of performing a KNN (K-nearest neighbor algorithm) searching after said performing a Kd-tree algorithm.

7. The method according to claim 1, wherein said weighting function comprises a sigmoid weighting function $S_M(t)$ $$S_M(t) = \frac{1}{1+e^t}.$$

8. The method according to claim 1, wherein said rectification function describes as below $$Value_M = Value + sign \times dist(Value - Kd) \times S_M\left(\frac{dist(Value - Kd)}{dist_{Normalize}(Value - Kd)}\right)$$

$$\begin{cases} Value: \text{assumed intensity changes intercepted at interpolation position} \\ dist: \text{the distance function} \\ Kd: \text{close points found by } k\text{-}d \text{ tree} \\ S_M: \text{the sigmoid weighting function} \end{cases}$$

* * * * *